United States Patent
Nakayama et al.

(10) Patent No.: US 9,360,241 B2
(45) Date of Patent: *Jun. 7, 2016

(54) HEAT PUMP SYSTEM

(75) Inventors: Hiroshi Nakayama, Sakai (JP); Shuji Fujimoto, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 612 days.

This patent is subject to a terminal disclaimer.

(21) Appl. No.: 13/807,710

(22) PCT Filed: Jul. 13, 2011

(86) PCT No.: PCT/JP2011/065936
§ 371 (c)(1),
(2), (4) Date: Dec. 28, 2012

(87) PCT Pub. No.: WO2012/008479
PCT Pub. Date: Jan. 19, 2012

(65) Prior Publication Data
US 2013/0098102 A1    Apr. 25, 2013

(30) Foreign Application Priority Data

Jul. 15, 2010 (JP) ................. 2010-160745

(51) Int. Cl.
*F25B 30/02* (2006.01)
*F25B 1/10* (2006.01)
(Continued)

(52) U.S. Cl.
CPC . *F25B 30/02* (2013.01); *F24D 3/18* (2013.01); *F24D 17/02* (2013.01); *F25B 1/10* (2013.01);
(Continued)

(58) Field of Classification Search
CPC .. F25B 1/10; F25B 2400/072; F25B 2309/06; F25B 2309/061; F25B 2339/047; F24D 17/02; F24D 3/18; F24D 19/1054; F24D 19/1087; Y02B 30/12

USPC ............. 62/175, 238.1, 238.6, 510, 332, 335
See application file for complete search history.

(56) References Cited

U.S. PATENT DOCUMENTS 1,570,995 A * 1/1926 De Lony .................... 62/115
7,024,877 B2 * 4/2006 Yap ............................. 62/238.6
(Continued)

FOREIGN PATENT DOCUMENTS

JP    2002-106988 A    4/2002
JP    2002106988    *    4/2002

OTHER PUBLICATIONS

Kuwabara, JP2002106988TRANS (English Translation), Apr. 2002.*

(Continued)

*Primary Examiner* — M. Alexandra Elve
*Assistant Examiner* — Eric Ruppert
(74) *Attorney, Agent, or Firm* — Global IP Counselors

(57) ABSTRACT

A heat pump system includes a heat pump circuit, a load distribution element, and a controller. The heat pump circuit includes low-stage and high-stage compression mechanisms having a fixed capacity ratio relationship. The load distribution element establishes a load distribution between first and second heat loads subjected to heating processes by heat exchange with refrigerant discharged from the low-stage and high-stage compression mechanisms, respectively. The controller performs distribution control to maintain a ratio of 1 between temperatures of the refrigerant discharged from the low-stage and high stage compression mechanisms and after heat exchange with the first and second heat loads, respectively. Alternatively, the controller performs distribution control to reduce a difference between the temperatures of the refrigerant discharged from the low-stage and high stage compression mechanisms and after heat exchange with the first and second heat loads, respectively.

4 Claims, 7 Drawing Sheets

(51) Int. Cl.
*F24D 17/02* (2006.01)
*F24D 3/18* (2006.01)
*F25B 40/00* (2006.01)
*F24D 19/10* (2006.01)

(52) U.S. Cl.
CPC ......... *F24D 19/1054* (2013.01); *F24D 19/1087* (2013.01); *F25B 40/00* (2013.01); *F25B 2339/047* (2013.01); *F25B 2400/072* (2013.01); *F25B 2400/13* (2013.01)

(56) References Cited

U.S. PATENT DOCUMENTS 8,549,868 B2 * 10/2013 Komori et al. ............... 62/238.7
2011/0036110 A1 2/2011 Fujimoto et al.

OTHER PUBLICATIONS

International Preliminary Report of corresponding PCT Application No. PCT/JP2011/065936.

* cited by examiner

HEAT PUMP SYSTEM

CROSS-REFERENCE TO RELATED APPLICATIONS

This U.S. National stage application claims priority under 35 U.S.C. §119(a) to Japanese Patent Application Nos. 2010-160745, filed in Japan on Jul. 15, 2010, the entire contents of which are hereby incorporated herein by reference.

TECHNICAL FIELD

The present invention relates to a heat pump system.

BACKGROUND ART

In conventional practice, there have been proposed systems that heat water using both refrigerant discharged from a low-stage compressor and refrigerant discharged from a high-stage compressor in a multi-stage compression refrigeration cycle, such as the heat pump water heater disclosed in Japanese Laid-open Patent Application No. 2002-106988, for example.

With this system, not only can the compression efficiency be made satisfactory by using a multi-stage compression system in a heat pump circuit, but there is also an attempt to make energy efficiency satisfactory by using the refrigerant discharged from the high-stage compressor as well as the refrigerant discharged from the low-stage compressor to heat up hot water for a hot-water supply.

Specifically, this system uses a configuration wherein a valve is provided so as to branch the flow of water for the hot-water supply, one flow of hot water is heated by the refrigerant discharged from the high-stage compressor, and the other flow of hot water is heated by the refrigerant discharged from the low-stage compressor. From the perspective of making the cycle efficiency satisfactory, it is proposed that the branched flow ratio of water for the hot-water supply would preferably be such that the other flow heated by the refrigerant discharged from the low-stage compressor is set to half or less of the total water amount.

SUMMARY

Technical Problem

In one type of a multi-stage compression refrigeration cycle, the capacity ratio of the different-stage compressors is fixed, such as the drive shafts of the different-stage compressors being shared, for example. In such a type with a fixed capacity ratio, the capacities of the different-stage compressors cannot be controlled separately because the actions of the low-stage compressor and the high-stage compressor are coordinated, for example.

With the multi-stage compression refrigeration cycle such as is disclosed in Japanese Laid-open Patent Application No. 2002-106988 listed above, there are no considerations given to the restrictions on the capacity ratio, such as the capacity ratio of the low-stage and high-stage compressors being fixed.

In a refrigeration cycle that uses compressors having a fixed capacity ratio, for example, when the target temperature of the high-stage discharged refrigerant is established, the low-stage drive state is sometimes correspondingly established, and the temperature of refrigerant flowing from the low-stage side to the high-stage side is sometimes established. In such cases, sometimes the energy consumption efficiency cannot be sufficiently made satisfactory simply by setting the flow rate ratio of water for the hot-water supply for heating by the refrigerant discharged from the low-stage compressor to half or less of the total flow rate, such as in the system disclosed in a Japanese Laid-open Patent Application No. 2002-106988.

An object of the present invention is to provide a heat pump system capable of satisfactory energy consumption efficiency, even when a multi-stage compression refrigeration cycle having a fixed capacity ratio is used.

Solution to Problem

The heat pump system according to a first aspect comprises a heat pump circuit, load distribution element (means), and a controller. The heat pump circuit has at least a compression mechanism, an expansion mechanism, and an evaporator, and refrigerant circulates through the heat pump circuit. The compression mechanism has a low-stage compression mechanism and a high-stage compression mechanism having a fixed capacity ratio relationship. The load distribution element (means) establishes the load distribution between a first heat load and a second heat load. The first heat load is a heat load subjected to a heating process by heat exchange with a refrigerant discharged from the low-stage compression mechanism. The second heat load is a heat load subjected to a heating process by heat exchange with a refrigerant discharged from the high-stage compression mechanism. The controller performs either the one control or the other control below to perform distribution control for operating the load distribution element (means). When one control is performed, the controller operates the load distribution element (means) so as to maintain a state of satisfying a predetermined temperature condition including that there be a ratio of 1 between the temperature of the refrigerant that has been discharged from the low-stage compression mechanism and then ended heat exchange with the first heat load, and the temperature of the refrigerant that has been discharged from the high-stage compression mechanism and then ended heat exchange with the second heat load. When the other control is performed, the controller operates the load distribution element (means) so as to reduce the difference between the temperature of the refrigerant that has been discharged from the low-stage compression mechanism and then ended heat exchange with the first heat load, and the temperature of the refrigerant that has been discharged from the high-stage compression mechanism and then ended heat exchange with the second heat load. The refrigerant herein may be a refrigerant containing a hydrocarbon, a carbon dioxide refrigerant, or the like, for example. Among the types of loads such as heating water for a hot-water supply, or heating water used in a radiator, a floor heating, or the like, the types of loads may be the same as the first heat load and the second heat load, or the types of loads may be different. For example, the amounts of heat obtained by the heating process in the first heat load and the heating process in the second heat load may be ultimately supplied to the same destination, or the first heat load and the second heat load may be independent of each other in terms of heat energy. The compression mechanism may have another compression mechanism separate from the high-stage compression mechanism and the low-stage compression mechanism, and this separate compression mechanism may be connected in series or in parallel. The high-stage compression mechanism and the low-stage compression mechanism may be a so-called single-shaft multi-stage mechanism having a shared drive shaft, or they may be controlled so that their capacity ratio is fixed, for example. The distribution control may be control such that the conditions of both the one control and the other control are satisfied simultaneously, or control such that only one condition is satisfied and the other process is not performed.

In this heat pump system, because the relationship between the high-stage compression mechanism and the low-stage compression mechanism is one of a fixed capacity ratio, the high-stage compression mechanism and the low-stage compression mechanism cannot be driven freely. Therefore, neither the temperature of refrigerant discharged from the high-stage compression mechanism nor the temperature of refrigerant discharged from the low-stage compression mechanism can be regulated freely, and when one is regulated, the other is regulated as well.

In this heat pump system, assuming such a configuration to be in effect, the temperature of refrigerant flowing into the first heat exchanger and the temperature of refrigerant flowing into the second heat exchanger are not regulated by controlling the high-stage compression mechanism and/or the low-stage compression mechanism, and by performing distribution control for operating the load distribution means, either a state is maintained in which the temperature of the refrigerant that has ended heat exchange with the first heat load and the temperature of the refrigerant that has ended heat exchange with the second heat load satisfy the predetermined temperature condition, or the difference between the two temperatures is reduced.

Thus, in a heat pump system in which the high-stage compression mechanism and the low-stage compression mechanism are in a relationship of having a fixed capacity ratio, it is possible to either maintain a state in which the temperature of the refrigerant that has ended heat exchange with the first heat load and the temperature of the refrigerant that has ended heat exchange with the second heat load satisfy the predetermined temperature condition, or to reduce the difference between the two temperatures, not by control of the compression mechanism, but by distribution control using the load distribution means. As a result, the energy consumption efficiency in the heat pump circuit can be improved.

Improving the energy consumption efficiency herein may involve, for example, improving the coefficient of performance (COP) in a state of the heat pump circuit wherein the load is at maximum, the outside temperature is at maximum, and the compression mechanism is outputting the rated capability thereof; improving the annual performance factor (APE) which is an index that also accounts for seasonal performance; or other improvements.

The heat pump system according to a second aspect is the heat pump system according to the first aspect, further comprising a first heat exchanger and a second heat exchanger. The load distribution means has a heat load circuit and a flow rate regulation mechanism. The heat load circuit has a branching portion, a converging portion, a first passage, and a second passage, and a fluid flows through the heat load circuit. The first passage connects the branching portion and the converging portion. The second passage connects the branching portion and the converging portion without converging with the first passage. The flow rate regulation mechanism is capable of regulating the ratio of the flow rate of the fluid flowing through the first passage and the flow rate of the fluid flowing through the second passage. The first heat exchanger performs heat exchange between the refrigerant flowing from the discharge side of the low-stage compression mechanism toward the intake side of the high-stage compression mechanism and the fluid flowing through the first passage. The second heat exchanger performs heat exchange between the refrigerant flowing from the high-stage compression mecha-nism to the expansion mechanism and the fluid flowing through the second passage. In the distribution control performed by the controller, either the one control or the other control below is performed by operating the flow rate regulation mechanism. In the one control, the controller operates the flow rate regulation mechanism so as to maintain a state of satisfying a predetermined temperature condition including that there be a ratio of 1 between the temperature of the refrigerant flowing through an outlet of the first heat exchanger in the heat pump circuit and the temperature of the refrigerant flowing through an outlet of the second heat exchanger in the heat pump circuit. In the other control, the controller operates the flow rate regulation mechanism so as to reduce the difference between the temperature of the refrigerant flowing through the outlet of the first heat exchanger in the heat pump circuit and the temperature of the refrigerant flowing through the outlet of the second heat exchanger in the heat pump circuit. The fluid includes a secondary refrigerant, such as water for hot-water supply applications, water as a heat medium used in a radiator or floor heating, or the like. The distribution control may be control such that the conditions of both the one control and the other control are satisfied simultaneously, or control such that only one condition is satisfied and the other process is not performed.

In this heat pump system, by operating the flow rate regulation mechanism, it is possible to supply heat in a plurality of locations in the first heat exchanger and the second heat exchanger to the fluid flowing through the heat load circuit, which is one type of a heat load, while making energy consumption efficiency satisfactory in the heat pump circuit.

The heat pump system according to a third aspect is the heat pump system according to the second aspect, wherein the controller performs high-stage discharge temperature control in cases in which the following condition is satisfied. This condition is a case in which the temperature of the refrigerant flowing into the second heat exchanger is higher than the temperature of the refrigerant flowing into the first heat exchanger and the flow rate of the fluid flowing to the first heat exchanger is less than a first predetermined flow rate due to the flow rate regulation control being performed. In high-stage discharge temperature control, the controller controls the flow rate regulation mechanism so that the flow rate of the fluid flowing to the first heat exchanger is maintained at a flow rate equal to or exceeding the first predetermined flow rate, and controls the heat pump circuit so as to raise the target temperature of the discharged refrigerant of the high-stage compression mechanism.

In this heat pump system, it is possible to reduce damage to the first heat exchanger caused by the fluid continuing to flow at a low speed.

Damage to the first heat exchanger caused by the fluid continuing to flow at a low speed includes pitting corrosion and the like in steel pipes occurring in locations where the flow speed of the fluid is low. An example of such pitting corrosion is localized corrosion of the metal, wherein small holes (pin holes) form in the surfaces of the steel pipes and corrosion of the steel pipes progresses in the interiors thereof. In cases of using water as the fluid described above, this pitting corrosion occurs readily when the residual chlorine concentration is high, and the control described above is therefore particularly beneficial in cases of using water as the fluid.

The heat pump system according to a fourth aspect is the heat pump system according to the third aspect, wherein the controller performs the high-stage discharge temperature control in orange such that the target temperature of the discharged refrigerant of the high-stage compression mechanism does not exceed a predetermined upper limit temperature. When the upper limit temperature is exceeded, the controller controls the flow rate regulation mechanism so that the fluid does not flow to the first heat exchanger but the fluid does flow to the second heat exchanger.

In this heat pump system, damage in the first heat exchanger in cases of the fluid flowing at low speeds can be reduced by interrupting the supply of the fluid. The fluid can be heated efficiently by the discharged refrigerant of the high-stage compression mechanism which has been raised to a high temperature that does not exceed the upper limit.

Advantageous Effects of Invention

In the heat pump system of the first aspect, the energy consumption efficiency in the heat pump circuit can be improved even with a configuration in which the high-stage compression mechanism and the low-stage compression mechanism are in a fixed capacity ratio relationship.

In the heat pump system of the second aspect, heat can be supplied in a plurality of locations to one type of heat load while the energy consumption efficiency is made satisfactory.

In the heat pump system of the third aspect, it is possible to reduce damage occurring in the first heat exchanger caused by the fluid continuing to flow at a low speed.

In the heat pump system of the fourth aspect, damage in the first heat exchanger can be reduced, and the fluid can be heated efficiently by the discharged refrigerant of the high-stage compression mechanism which has been raised to a high temperature that does not exceed the upper limit.

DESCRIPTION OF EMBODIMENTS

An embodiment of the present invention is described hereinbelow on the basis of the accompanying drawings.

(1) Configuration of Heat Pump System 1

Figure 1:
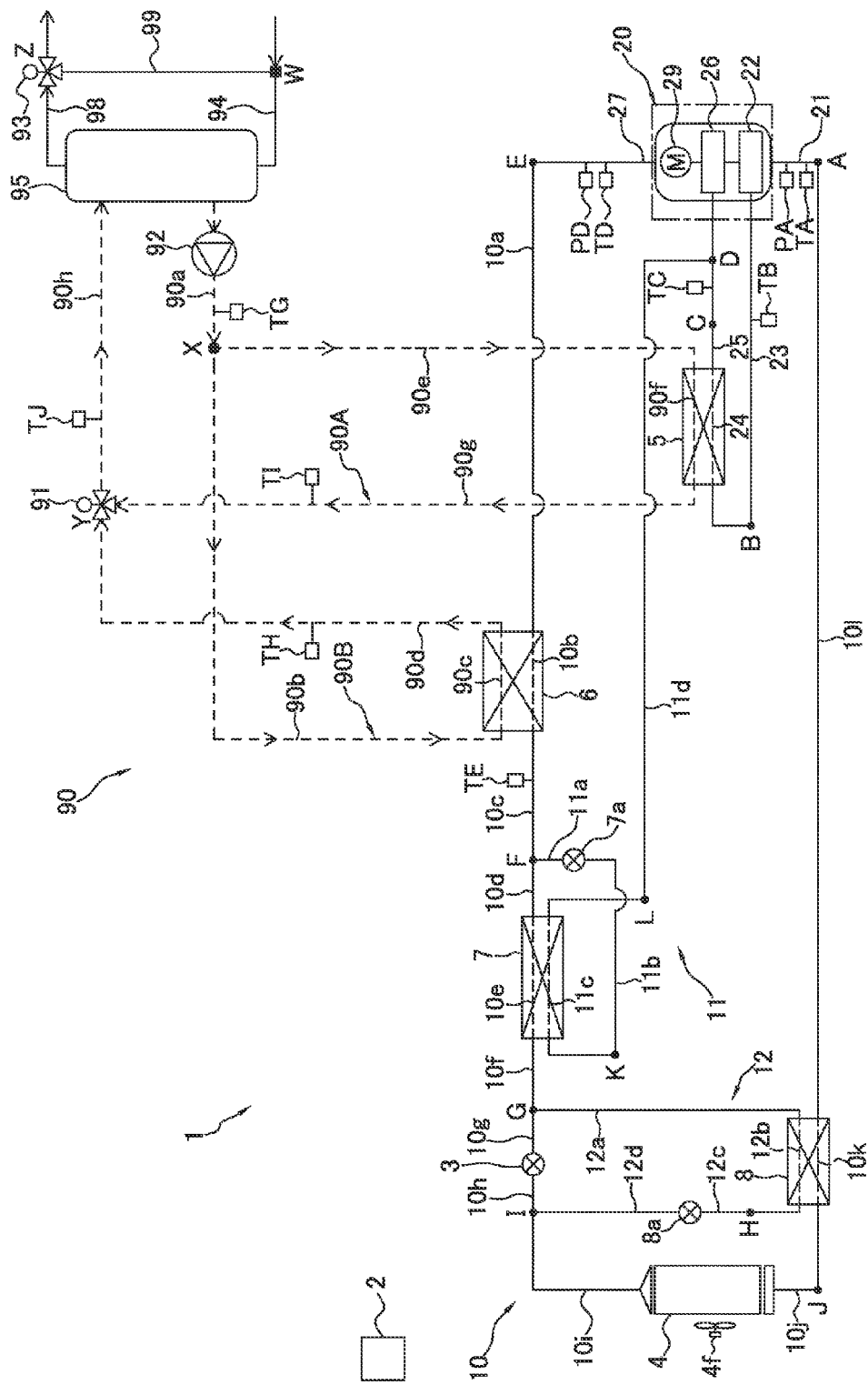
FIG. 1 is a schematic configuration view of the heat pump system.

FIG. 1 is a schematic configuration drawing of the heat pump system 1 according to an embodiment of the present invention.

The heat pump system 1 comprises a heat pump circuit 10, a fan 4f, a hot-water supply circuit 90, an intercooler 5, a gas cooler 6, a controller 2, and other components. The heat pump system 1 is a system that uses heat obtained by the heat pump circuit 10 as heat for supplying hot water via the hot-water supply circuit 90.

(1-1) Heat Pump Circuit 10

Figure 2:
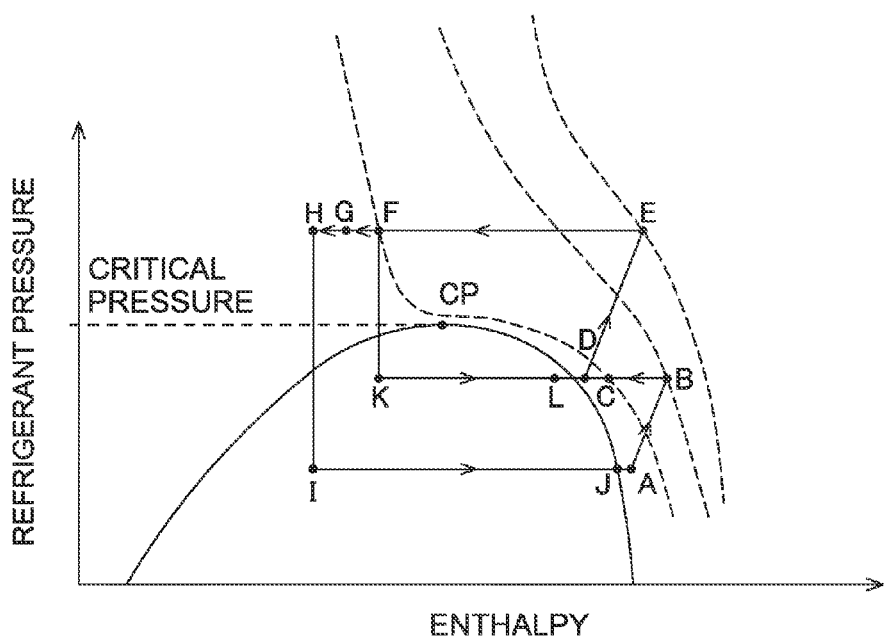
FIG. 2 is a graph of pressure-enthalpy in the heat pump circuit comprising a fixed capacity ratio compression mechanism.

The heat pump circuit 10 is a circuit that uses a natural refrigerant through which carbon dioxide circulates as a primary refrigerant. The heat pump circuit 10 comprises a compression mechanism 20, a main expansion valve 3, an evaporator 4, refrigerant tubes 10a to 10l, an economizer heat exchanger 7, an economizer expansion valve 7a, an injection flow passage 11, a liquid-gas heat exchanger 8, a liquid-gas expansion valve 8b, a liquid-gas heat exchange flow passage 12, and other components. FIG. 2 is a graph of pressure-enthalpy showing the states of various points in the heat pump circuit 10 of FIG. 1.

The compression mechanism 20 has a low-stage compression mechanism 22, a high-stage compression mechanism 26, a drive motor 29, and other components. The low-stage compression mechanism 22 and the high-stage compression mechanism 26 have a shared drive axis driven by the drive motor 29, and the capacity ratio thereof is fixed. The low-stage compression mechanism 22 draws refrigerant passing through point A through an intake tube 21, compresses the refrigerant to an intermediate pressure, and sends the refrigerant out to a first intermediate pressure tube 23. The refrigerant flowing through the first intermediate pressure tube 23 passes through point B, flows through a second intermediate pressure tube 24 and a third intermediate pressure tube 25 inside the intercooler 5, and then gets drawn into the high-stage compression mechanism 26. The refrigerant drawn in by the high-stage compression mechanism 26 is further compressed to a high pressure and discharged via a discharge tube 27. An intake refrigerant temperature sensor TA and an intake refrigerant pressure sensor PA are provided to the intake tube 21. A discharged refrigerant temperature sensor TD and a discharged refrigerant pressure sensor PD are provided to the discharge tube 27. A pre-intercooler refrigerant temperature sensor TB is provided to the first intermediate pressure tube 23. Provided at some point in the third intermediate pressure tube 25 is a converging point D, where refrigerant flowing through point C converges with refrigerant flowing through the injection flow passage 11, described hereinafter. Near point C, which is farther downstream in the third intermediate pressure tube 25 than the converging point D, a post-intercooler refrigerant temperature sensor TC is provided. The refrigerant discharged from the discharge tube 27 of the compression mechanism 20 flows through a circuit containing a first refrigerant tube 10a, a second refrigerant tube 10b, a third refrigerant tube 10c, a fourth refrigerant tube 10d, a fifth refrigerant tube 10e, a sixth refrigerant tube 10f, a seventh refrigerant tube 10g, the main expansion valve 3, an eighth refrigerant tube 10h, a ninth refrigerant tube 10i, the evaporator 4, a tenth refrigerant tube 10j, an eleventh refrigerant tube 10k, and a twelfth refrigerant tube 10l, all connected in the order listed.

The discharge tube 27 of the compression mechanism 20 and the first refrigerant tube 10a are connected via point E. The second refrigerant tube 10b flows through the interior of the gas cooler 6. The third refrigerant tube 10c is provided with a post-gas cooler refrigerant temperature sensor TE for sensing the temperature of refrigerant flowing through the interior. The injection flow passage 11 branches from a branching point F, which is the connecting portion between the third refrigerant tube 10c and the fourth refrigerant tube

10*d*. The fifth refrigerant tube 10*e* flows through the interior of the economizer heat exchanger 7. The liquid-gas heat exchange flow passage 12 connects a branching point G, which is the connecting portion between the sixth refrigerant tube 10*f* and the seventh refrigerant tube 10*g*, and a converging point I, which is the connecting portion between the eighth refrigerant tube 10*h* and the ninth refrigerant tube 10*i*, without going through the main expansion valve 3. An air flow from the fan 4*f* whose output is controlled by the controller 2 is supplied to the evaporator 4 disposed outside of the room. An outdoor air temperature sensor (not shown) is provided for sensing the temperature of outdoor air supplied to the evaporator 4, and the controller 2 can perceive the outdoor air temperature. The eleventh refrigerant tube 10*k* passes through the interior of the liquid-gas heat exchanger 8. The twelfth refrigerant tube 10*l* is connected with the intake tube 21 of the compression mechanism 20 at point A.

The injection flow passage 11 branches from the above-mentioned branching point F, and extends to the converging point D of the third intermediate pressure tube 25 via a first injection flow passage 11*a*, the economizer expansion valve 7*a*, a second injection flow passage 11*b*, a third injection flow passage 11*c*, and a fourth injection flow passage 11*d*. The third injection flow passage 11*c* allows refrigerant depressurized by the economizer expansion valve 7*a* to flow through the interior of the economizer heat exchanger 7, and cools the refrigerant flowing through the fifth refrigerant tube 10*e*.

The liquid-gas heat exchange flow passage 12 branches from the above-mentioned branching point G, and extends to the above-mentioned converging point I via a first liquid-gas heat exchange flow passage 12*a*, a second liquid-gas heat exchange flow passage 12*b*, a third liquid-gas heat exchange flow passage 12*c*, a liquid-gas expansion valve 8*a*, and a fourth liquid-gas heat exchange flow passage 12*d*. The second liquid-gas heat exchange flow passage 12*b* flows through the interior of the liquid-gas heat exchanger 8, and raises the degree of superheat of the refrigerant flowing through the above-mentioned eleventh refrigerant tube 10*k*.

The opening degree of the main expansion valve 3 and the opening degree of the liquid-gas expansion valve 8*a* are controlled by the controller 2. The amount of refrigerant flowing to the liquid-gas heat exchange flow passage 12 is thereby regulated, and the states of refrigerant supplied to the evaporator 4 and refrigerant drawn into the compression mechanism 20 are regulated.

(1-2) Hot-Water Supply Circuit 90

The hot-water supply circuit 90 is a circuit for boiling the water in a hot water storage tank 95 by the heat of the heat pump circuit 10 in the gas cooler 6 and the intercooler 5. The hot water storage tank 95 of the hot-water supply circuit 90 is supplied with water from the exterior to the bottom end portion via a branching point W and a water supply tube 94, and the hot water storage tank 95 stores the water in the interior. A hot-water supply tube 98 extends from the top end vicinity of the hot water storage tank 95. A temperature regulation valve 93 provided to a converging point Z regulates the mixture ratio of a hot-water supply tube 98 and a hot-water supply bypass tube 99 that extends from the branching point W, yielding water of an appropriate temperature which is supplied to locations where the water will be used. The mixture ratio of the temperature regulation valve 93 is controlled by the controller 2. The hot-water supply circuit 90 forms a heat load circuit of a load distribution element.

Low-temperature water stored in the hot water storage tank 95 flows out through a supply passage 90*a* extending from the bottom, and the water is heated in the intercooler 5 and the gas cooler 6. The water heated in the intercooler 5 and the gas cooler 6 is returned to the top of the hot water storage tank 95 via a return passage 90*h*.

The supply passage 90*a* is provided with a hot-water supply pump 92 whose circulation rate is driveably controlled by the controller 2, and a supply passage temperature sensor TG for sensing the temperature of the water flowing through the supply passage 90*a*. At a branching point X, the supply passage 90*a* branches into an intercooler hot-water supply flow passage 90A and a gas cooler hot-water supply flow passage 90B. The intercooler hot-water supply flow passage 90A and the gas cooler hot-water supply flow passage 90B converge at a converging point Y and connect to the return passage 90*h*. The return passage 90*h* is provided with a return passage temperature sensor TJ for sensing the temperature of the water flowing through the return passage 90*h*. Provided at the converging point Y is a mixing valve 91 whose mixture ratio is regulated by the controller 2, and the ratio between the amount of water flowing to the intercooler hot-water supply flow passage 90A and the amount of water flowing to the gas cooler hot-water supply flow passage 90B can be regulated.

The gas cooler hot-water supply flow passage 90B has a first gas cooler hot-water supply flow passage 90*b* extending from the branching point X, a second gas cooler hot-water supply flow passage 90*c*, and a third gas cooler hot-water supply flow passage 90*d* extending to the converging point Y. The water flowing through the second gas cooler hot-water supply flow passage 90*c* flows through the interior of the gas cooler 6, and this water is heated by the refrigerant flowing through the second refrigerant tube 10*b* of the heat pump circuit 10. A gas cooler hot-water supply outlet temperature sensor TH senses the temperature of the water flowing through the third gas cooler hot-water supply flow passage 90*d*. The flow direction of the refrigerant flowing through the second refrigerant tube 10*b* of the gas cooler 6 of the heat pump circuit 10 and the flow direction of the water flowing through the second gas cooler hot-water supply flow passage 90*c* of the hot-water supply circuit 90 are configured so as to be opposite of each other.

The intercooler hot-water supply flow passage 90A has a first intercooler hot-water supply flow passage 90*e* extending from the branching point X, a second intercooler hot-water supply flow passage 90*f*, and a third intercooler hot-water supply flow passage 90*g* extending to the converging point Y. The water flowing through the second intercooler hot-water supply flow passage 90*f* flows through the interior of the intercooler 5, and the water is heated by the heat of the refrigerant flowing through the second intermediate pressure tube 24 of the heat pump circuit 10. An intercooler hot-water supply outlet temperature sensor TI senses the temperature of the water flowing through the third intercooler hot-water supply flow passage 90*g*. The flow direction of the refrigerant flowing through the second intermediate pressure tube 24 of the intercooler 5 of the heat pump circuit 10 and the flow direction of the water flowing through the second intercooler hot-water supply flow passage 90*f* of the hot-water supply circuit 90 are configured so as to be opposite of each other.

(1-3) Controller 2

The controller controls the compression mechanism 20, the main expansion valve 3, the economizer expansion valve 7*a*, the liquid-gas expansion valve 8*a*, the fan 4*f*, the mixing valve 91, the hot-water supply pump 92, and other components by perceiving the intake refrigerant temperature sensor TA, the intake refrigerant pressure sensor PA, the pre-intercooler refrigerant temperature sensor TB, the post-intercooler refrigerant temperature sensor TC, the discharged refrigerant temperature sensor TD, the discharged refrigerant pressure sensor PD, the post-gas cooler refrigerant temperature sensor TE, the supply passage temperature sensor TG, the return passage temperature sensor TJ, the gas cooler hot-water supply outlet temperature sensor TH, the intercooler hot-water supply outlet temperature sensor TI, the outside air temperature, and the like.

(2) Action of Heat Pump Circuit 10

(2-1) Compression Mechanism 20

The controller 2 performs output control on the drive motor 29 so that in the heat pump circuit 10, the discharged refrigerant temperature of the high-stage compression mechanism 26 (the temperature sensed by the discharged refrigerant temperature sensor TD) reaches a target refrigerant temperature and the discharged refrigerant pressure (the pressure sensed by the discharged refrigerant pressure sensor PD) reaches a target refrigerant pressure. The target refrigerant temperature and the target refrigerant pressure may be suitably regulated by the controller 2 in accordance with the outside air temperature, various operating conditions, and/or other factors, or they may be regulated by user input to the controller 2. By regulating the entire heat pump circuit 10, the controller 2 regulates the refrigerant discharged by the high-stage compression mechanism 26 so that a predetermined upper limit refrigerant temperature is not exceeded and a predetermined upper limit refrigerant pressure is not exceeded. Because carbon dioxide is used as the refrigerant in the present embodiment, the discharged refrigerant pressure of the high-stage compression mechanism 26 exceeds the critical pressure.

Figure 9:
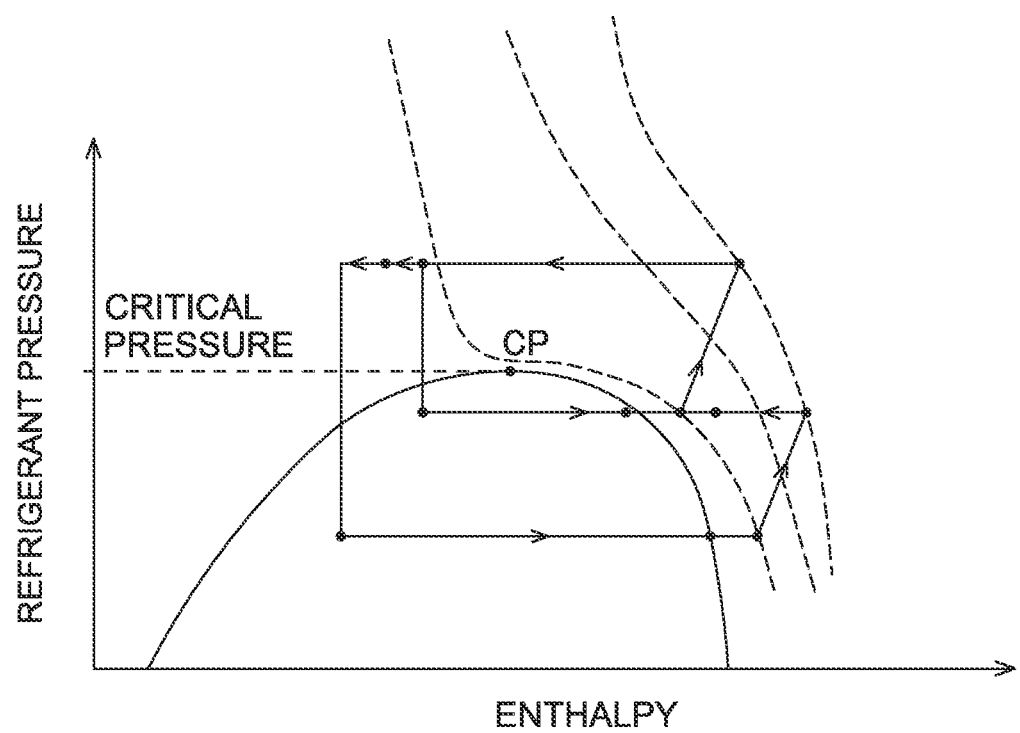
FIG. 9 is a graph of pressure-enthalpy in a conventional pump circuit comprising an unfixed capacity ratio compression mechanism.

Because the capacity ratio between the high-stage compression mechanism 26 and the low-stage compression mechanism 22 is fixed in the compression mechanism 20, when the target discharged refrigerant temperature and the target discharged refrigerant pressure are established as described above, the intake refrigerant pressure of the low-stage compression mechanism 22 (intake refrigerant pressure sensor PA) and/or the intermediate refrigerant pressure (the discharged refrigerant pressure of the low-stage compression mechanism 22 is equal to the intake refrigerant pressure of the high-stage compression mechanism 26) corresponding to this condition are established. When the target discharged refrigerant temperature and the target discharged refrigerant pressure have varied, the intake refrigerant pressure and/or the intermediate refrigerant pressure change accordingly. Because the compression mechanism 20 of the present embodiment has a fixed capacity ratio, the underlying assumptions are different in this respect from that of a conventional unfixed capacity ratio compression mechanism such as is shown in FIG. 9, wherein output can be controlled freely between the high-stage and low-stage sides, and the discharged refrigerant temperature can be controlled so as to match up between the high-stage and low-stage sides because the discharged refrigerant temperature can be freely controlled.

Because the relationship between the discharge pressure, the intermediate pressure, and the low-stage pressure is established by fixing the capacity ratio in the compression mechanism 20, the discharged refrigerant temperature of the high-stage compression mechanism 26 and the discharged refrigerant temperature of the low-stage compression mechanism 22 cannot be freely regulated, other than being regulated by the degree of cooling in the intercooler 5 and/or the refrigerant converging from the injection flow passage 11. Under such operating conditions, normally the discharged refrigerant temperature of the high-stage compression mechanism 26 is controlled so as to be higher than the discharged refrigerant temperature of the low-stage compression mechanism 22. Therefore, depending on the operating situation, there are sometimes states in which the discharged refrigerant temperature of the low-stage compression mechanism 22 cannot exceed the target temperature in the hot-water supply circuit 90, and the water temperature achieved in the intercooler hot-water supply flow passage 90A does not meet the target temperature. In such cases, the controller 2 regulates the temperature of the water flowing through the return passage 90h so that the target temperature is reached, by manipulating the water temperature and amount of heat in the water amount achieved in the gas cooler hot-water supply flow passage 90B, as described hereinafter.

(2-2) Economizer Expansion Valve 7a

The controller 2 controls the opening degree of the economizer expansion valve 7a so that the refrigerant drawn in by the high-stage compression mechanism 26 reaches a state of a predetermined degree of superheat at the intermediate refrigerant pressure established by the target refrigerant pressure and the target refrigerant temperature. When the opening degree of the economizer expansion valve 7a is increased, the amount of refrigerant flowing into the converging point D of the third intermediate pressure tube 25 via the injection flow passage 11 increases, and the degree of superheat of the refrigerant drawn into the high-stage compression mechanism 26 can therefore be reduced.

When the opening degree of the economizer expansion valve 7a is reduced, the amount of refrigerant flowing into the converging point D of the third intermediate pressure tube 25 via the injection flow passage 11 decreases, and the degree of superheat of the refrigerant drawn into the high-stage compression mechanism 26 can therefore be increased.

In these cases, the refrigerant flowing through the third injection flow passage 11c inside the economizer heat exchanger 7 changes in amount and temperature, and the temperature of the refrigerant flowing through the fifth refrigerant tube the of the economizer heat exchanger 7 therefore changes as well.

(2-3) Main Expansion Valve 3 and Liquid-Gas Expansion Valve 8a

The controller 2 regulates the opening degrees of the main expansion valve 3 and the liquid-gas expansion valve 8a so that the refrigerant drawn into the low-stage compression mechanism 22 reaches a state of having a predetermined degree of superheat. The controller 2 herein perceives the degree of superheat of the refrigerant drawn into the low-stage compression mechanism 22 by the values obtained from the intake refrigerant temperature sensor TA and the intake refrigerant pressure sensor PA.

When a control is performed for increasing the opening degree of the main expansion valve 3 and reducing the opening degree of the liquid-gas expansion valve 8a, the degree of superheat of the refrigerant drawn into the low-stage compression mechanism 22 can be reduced.

When a control is performed for reducing the opening degree of the main expansion valve 3 and increasing the opening degree of the liquid-gas expansion valve 8a, the degree of superheat of the refrigerant drawn into the low-stage compression mechanism 22 can be increased.

(2-4) Fan 4f

By controlling the air volume of the fan 1f on the basis of the outside air temperature and other factors, the controller 2 regulates the evaporation capability of the evaporator 4 so that the refrigerant drawn into the low-stage compression mechanism 22 achieves a predetermined degree of superheat.

(3) Action of Hot-Water Supply Circuit 90

With the hot-water supply circuit 90, a heating target temperature is inputted by the user via input means (not shown). The controller 2 controls the mixture ratio in the mixing valve 91 and the water flow rate in the hot-water supply pump 92 so that the temperature of the water flowing through the return passage 90h reaches this heating target temperature. The controller 2 also at least controls the compression mechanism 20 so that the discharge temperature of the high-stage compression mechanism 26 reaches a temperature exceeding the heating target temperature of the hot-water supply circuit 90.

(3-1) Mixing Valve 91

The mixing valve 91 specifically regulates the distribution ratio between the water flow rate in the intercooler hot-water supply flow passage 90A and the water flow rate in the gas cooler hot-water supply flow passage 90B, so that the outlet refrigerant temperature Ticout of the intercooler 5 in the heat pump circuit 10 (the temperature sensed by the post-intercooler refrigerant temperature sensor TC as the refrigerant temperature in the third intermediate pressure tube 25) and the outlet refrigerant temperature Tgcout of the gas cooler 6 in the heat pump circuit 10 (the temperature sensed by the post-gas cooler refrigerant temperature sensor TE as the refrigerant temperature in the third refrigerant tube 10c) are equal. The mixing valve 91 forms a flow regulation mechanism of the load distribution element. Thus, the load distribution element includes the hot-water supply circuit 90 (heat load circuit) and the mixing valve 91 (flow regulation mechanism).

As is described hereinafter, even when the controller 2 has controlled the mixing valve 91 so as to allow water to flow to the second intercooler hot-water supply flow passage 90f of the intercooler 5 under operating conditions such that the temperature sensed by the pre-intercooler refrigerant temperature sensor TB, equivalent to the intake refrigerant temperature of the intercooler 5, does not meet the heating target temperature of the hot-water supply circuit 90, the controller 2 cannot bring the temperature of the water flowing through the third intercooler hot-water supply flow passage 90g to or above the heating target temperature. However, even in such a situation, the controller 2 controls the mixing valve 91 so as to allow water to flow to the second intercooler hot-water supply flow passage 90f of the intercooler 5 only when a predetermined performance coefficient function condition pertaining to a hereinafter-described performance coefficient has been met.

(3-2) Hot-Water Supply Pump 92

The hot-water supply pump 92 specifically regulates the flow rate so that the temperature of the water flowing through the return passage 90h after the converging point Y (the temperature sensed by the return passage temperature sensor TJ) reaches the heating target temperature. Specifically, in the case that the refrigerant temperature in the second refrigerant tube 10b of the gas cooler 6 is higher than the heating target temperature and the refrigerant temperature in the second intermediate pressure tube 24 of the intercooler 5 is also higher than the heating target temperature, when the flow rate of the hot-water supply pump 92 is reduced, the time for heating the water in the gas cooler 6 and/or the intercooler 5 can be lengthened and the temperature of the water flowing through the return passage 90h can therefore be raised, and when the flow rate of the hot-water supply pump 92 is increased, the time for heating the water in the gas cooler 6 and/or the intercooler 5 can be shortened and the temperature of the water flowing through the return passage 90h can therefore be lowered.

Because the compression mechanism 20 has a fixed capacity ratio as described above, the temperature of refrigerant discharged from the high-stage compression mechanism 26 and the temperature of refrigerant discharged from the low-stage compression mechanism 22 cannot be controlled individually, and the discharged refrigerant temperatures sometimes differ. Depending on the target discharged refrigerant temperature and the target discharged refrigerant pressure, there are sometimes cases of operating conditions in which the temperature sensed by the pre-intercooler refrigerant temperature sensor TB does not meet the heating target temperature of the hot-water supply circuit 90, and even if the mixing valve 91 is controlled so as to allow water to flow to the second intercooler hot-water supply flow passage 90f of the intercooler 5, the temperature of the water flowing through the third intercooler hot-water supply flow passage 90g cannot be brought to or above the heating target temperature. However, when the hereinafter-described predetermined performance coefficient condition is satisfied, the controller 2 controls the mixing valve 91 so as to allow water to flow to the second intercooler hot-water supply flow passage 90f of the intercooler 5, and causes the outlet refrigerant temperature Ticout of the intercooler 5 and the outlet refrigerant temperature Tgcout of the gas cooler 6 to be equal. At this time, the controller 2 controls the mixing valve 91 and the hot-water supply pump 92 so that the heat of the water flowing through the third gas cooler hot-water supply flow passage 90d compensates for the amount of heat by which the water flowing through the third intercooler hot-water supply flow passage 90g falls short of the heating target temperature, whereby the temperature of the water flowing through the return passage 90h after the converging point Y reaches the heating target temperature. When the flow rate of the hot-water supply pump 92 is varied so as to achieve the heating target temperature, sometimes a difference will arise between the outlet refrigerant temperature Ticout of the intercooler 5 and the outlet refrigerant temperature Tgcout of the gas cooler 6, but in this case, the controller 2 again controls the distribution ratio in the mixing valve 91. When the distribution ratio of the mixing valve 91 is varied in order to reduce the difference between the outlet refrigerant temperature Ticout of the intercooler 5 and the outlet refrigerant temperature Tgcout of the gas cooler 6, sometimes there will be deviation from the heating target temperature, but in this case, the controller 2 again achieves the heating target temperature by regulating the flow rate of the hot-water supply pump 92. Thus, the controller 2 performs controls so as to satisfy these conditions while finely adjusting and controlling the mixing valve 91 and the hot-water supply pump 92.

When there continues to be a state in which the flow speed of water flowing through the second gas cooler hot-water supply flow passage 90c of the gas cooler 6 and the flow speed of water flowing through the second intercooler hot-water supply flow passage 90f of the intercooler 5 are below a predetermined flow speed, there is a risk of pitting corrosion in the steel pipe portions where the inside of the second gas cooler hot-water supply flow passage 90c of the gas cooler 6 comes in contact with water and the inside of the second intercooler hot-water supply flow passage 90f of the intercooler 5 comes in contact with water, causing damage to the pipes. Therefore, depending on the situation, the controller 2 performs either control for ensuring the minimum required flow rate or control for entirely stopping the flow, so that the flow speed of the water in these pipes does not continue to be below the predetermined flow speed.

As described above, these controls of the mixing valve 91 and of the hot-water supply pump 92 are performed simultaneously, the flow rate of the hot-water supply pump 92 sometimes varies due to the distribution ratio of the mixing valve 91 varying, and the distribution ratio of the mixing valve 91 sometimes varies due to the flow rate of the hot-water supply pump 92 varying.

(4) Relationship of Water Amount Distribution Ratio and Optimal COP

Figure 3:
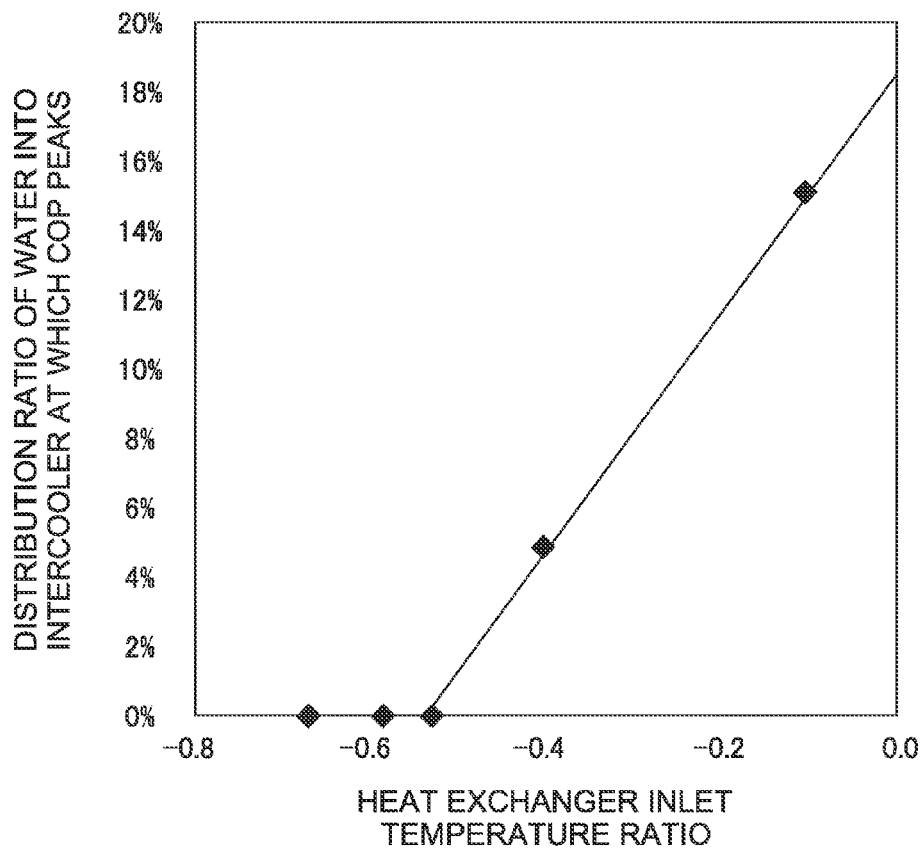
FIG. 3 is a graph showing the relationship between the COP and the temperature ratio of the intercooler and gas cooler.

FIG. 3 is a graph plotting the "distribution percentage of water flowing to the intercooler hot-water supply flow passage 90A" at which the COP of the heat pump circuit 10 reaches the optimal value, for each of various conditions such as outside air temperature, incoming water temperature, and heating target temperature when these conditions differ. In the state of the plots in FIG. 3, the outlet refrigerant temperature of the intercooler 5 and the outlet refrigerant temperature of the gas cooler 6 are equal, and the COP is optimized.

The "heat exchanger inlet temperature ratio" is a ratio obtained by subtracting the heating target temperature of the hot-water supply circuit 90 from the discharged refrigerant temperature Td1 of the low-stage compression mechanism 22 (the refrigerant temperature sensed by the pre-intercooler refrigerant temperature sensor TB), subtracting the heating target temperature of the hot-water supply circuit 90 from the discharged refrigerant temperature Td2 of the high-stage compression mechanism 26 (the refrigerant temperature sensed by the discharged refrigerant temperature sensor TD), and dividing the first resulting value by the second resulting value. The discharged refrigerant temperature Td2 of the high-stage compression mechanism 26 is controlled by the controller 2 so as to be higher than the heating target temperature of the hot-water supply circuit 90, and the value of the discharged refrigerant temperature Td2 of the high-stage compression mechanism 26 less the heating target temperature is therefore maintained as a positive value. Depending on the operating conditions of the heat pump circuit 10, the discharged refrigerant temperature Td1 of the low-stage compression mechanism 22 sometimes differs from the discharged refrigerant temperature Td2 of the high-stage compression mechanism 26 and falls below the heating target temperature of the hot-water supply circuit 90. In this case, the heating target temperature subtracted from the discharged refrigerant temperature Td1 of the low-stage compression mechanism 22 yields a negative value. FIG. 3 shows the relationship between the water distribution percentage and the coefficient of performance in the case of a negative heat exchanger inlet temperature ratio, i.e. in the case of operating conditions in which the temperature of refrigerant discharged from the low-stage compression mechanism 22 does not meet the heating target temperature (a case of operating conditions in which the water temperature in the third intercooler hot-water supply flow passage 90g cannot be brought to or above the heating target temperature).

The "distribution percentage of water flowing to the intercooler hot-water supply flow passage 90A" shows the percentage of the water amount flowing through the intercooler hot-water supply flow passage 90A that takes up the water amount flowing through the hot-water supply pump 92, and also shows the result of the distribution being controlled by the mixing valve 91. The state equivalent to "0%" in FIG. 3 is a state of stagnant flow, in which 100% of the water in the hot-water supply circuit 90 flows to the gas cooler hot-water supply flow passage 90B and no water at all flows to the intercooler hot-water supply flow passage 90A.

Thus, even in a situation in which the discharged refrigerant temperature Td1 of the low-stage compression mechanism 22 falls below the heating target temperature of the hot-water supply circuit 90, in a situation such that water flowing to the intercooler hot-water supply flow passage 90A yields a satisfactory COP as shown in FIG. 3, the controller 2 controls the mixing valve 91 so that water flows to the intercooler hot-water supply flow passage 90A with the optimal distribution ratio shown in FIG. 3. To simplify control, on the basis of the graph of FIG. 3, control is performed so that water flows to the intercooler hot-water supply flow passage 90A while the predetermined performance coefficient condition of the heat exchanger inlet temperature ratio being −0.5 or greater is satisfied.

Figure 4:
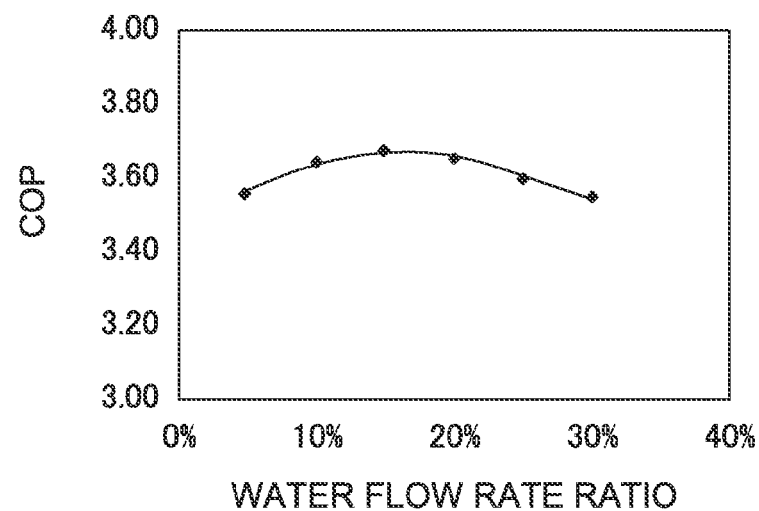
FIG. 4 is a graph showing the relationship between the water flow rate ratio and the COP.

(5) Relationship of Outlet Refrigerant Temperature of Gas Cooler 6, outlet Refrigerant Temperature of Intercooler 5, and Optimal COP FIG. 4 shows the relationship of the COP value to the distribution percentage of water flowing to the intercooler hot-water supply flow passage 90A in a case of raising the water temperature to the heating target temperature of 55° C. when the outside air temperature is 7° C., the discharged refrigerant temperature Td1 of the low-stage compression mechanism 22 is 55° C., the discharged refrigerant temperature Td2 of the high-stage compression mechanism 26 is 70° C., and the incoming water temperature is 30° C.

Figure 5:
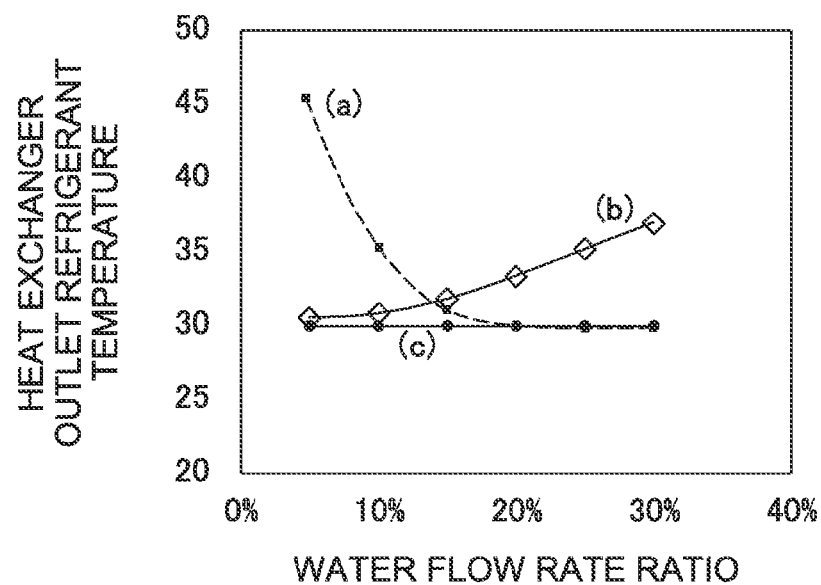
FIG. 5 is a graph showing the relationship between the outlet refrigerant temperature of the intercooler, the outlet refrigerant temperature of the gas cooler, and the water flow rate ratio.

FIG. 5 shows the relationship of the outlet refrigerant temperature of the intercooler 5, the outlet refrigerant temperature of the gas cooler 6, and the water temperature to the distribution percentage of water flowing to the intercooler hot-water supply flow passage 90A under the same conditions as those of FIG. 4. In FIG. 5, (a) shows the temperature of water flowing through the third intercooler hot-water supply flow passage 90g, (b) shows the temperature of water flowing through the third gas cooler hot-water supply flow passage 90d, and (c) shows the incoming water temperature to the water supply tube 94.

As can be seen from FIGS. 4 and 5, the COP is at its optimum when the outlet refrigerant temperature of the intercooler 5 and the outlet refrigerant temperature of the gas cooler 6 are equal (this condition example is a case of the water distribution percentage being 15%).

(6) Water Distribution Control

Figure 6:
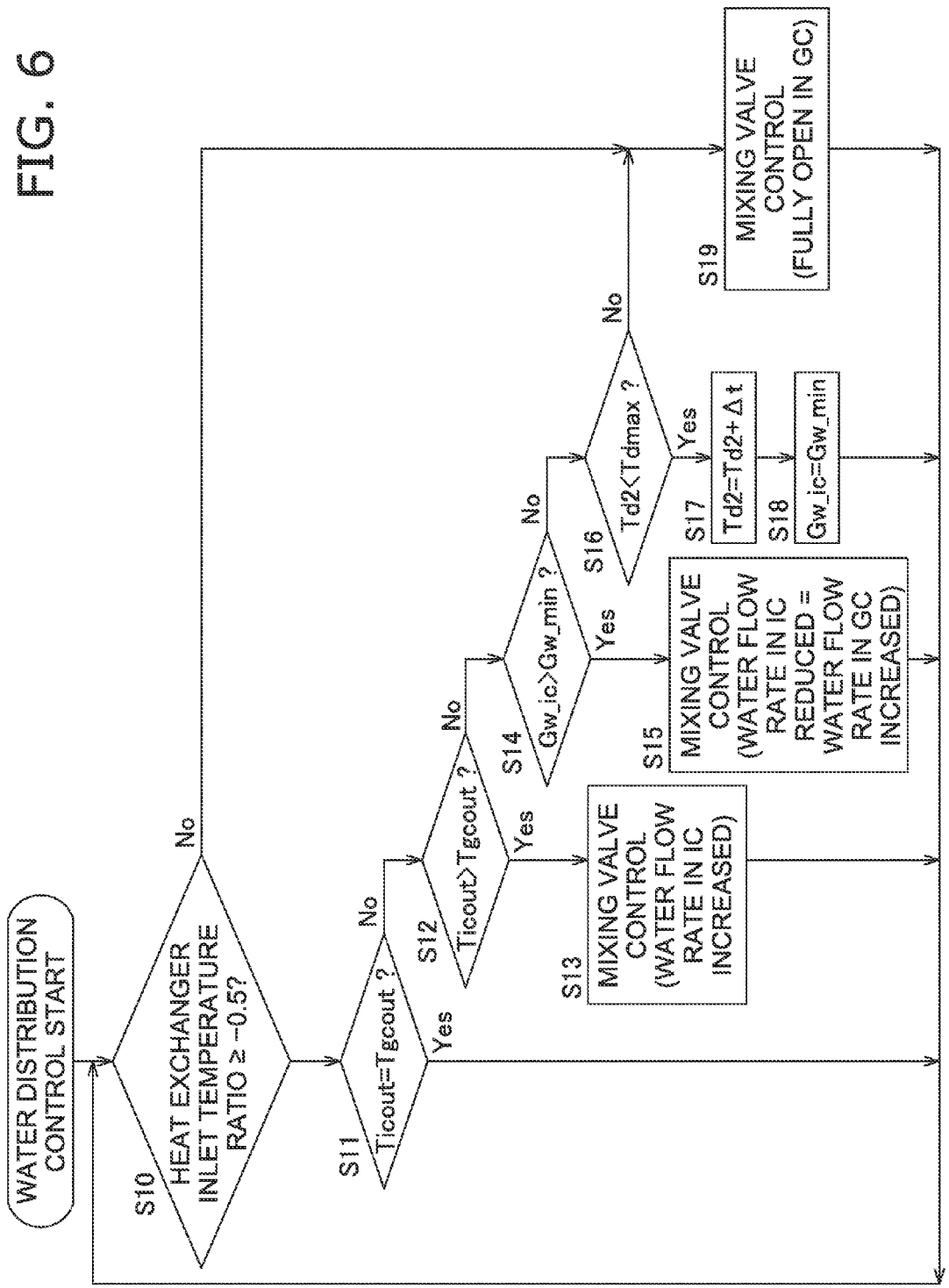
FIG. 6 is a flowchart of water distribution control.

According to the relationship of FIGS. 3, 4, and 5 described above, the controller 2 performs a control such as is shown in the flowchart of FIG. 6 in order to satisfactorily increase the COP of the heat pump circuit 10.

The mixing valve 91 and the hot-water supply pump 92 of the hot-water supply circuit 90 are controlled so that water can flow to the intercooler hot-water supply flow passage 90A when the COP can be satisfactorily increased and also so that the outlet refrigerant temperature of the intercooler 5 and the outlet refrigerant temperature of the gas cooler 6 can be brought near to each other, and control is performed by the controller 2 so as to regulate the output of the compression mechanism 20 within a range such that the temperature of refrigerant discharged from the high-stage compression mechanism 26 does not exceed a predetermined upper limit refrigerant temperature, so that the water flow speed in the intercooler hot-water supply flow passage 90A can be maintained at or above a predetermined flow speed such that pitting corrosion can be suppressed.

The flow of control is described hereinbelow according to the flowchart of FIG. 6.

In step S10, the controller 2 assesses whether or not the heat exchanger inlet temperature ratio satisfies the predetermined performance coefficient condition, i.e., whether or not the heat exchanger inlet temperature ratio is −0.5 or greater. When the heat exchanger inlet temperature ratio is less than −0.5, the controller 2 assesses that the situation is such that the COP cannot be raised even if water flows to the intercooler hot-water supply flow passage 90A, and the sequence transitions to step S19. When the heat exchanger inlet temperature ratio is equal to or greater than −0.5, the controller 2 assesses that the situation is such that allowing water to flow to the intercooler hot-water supply flow passage 90A can satisfactorily increase the COP, and the sequence transitions to step S11.

In step S11; the controller 2 assesses whether or not the outlet refrigerant temperature Tgcout of the gas cooler 6 and the outlet refrigerant temperature Ticout of the intercooler 5 are equal in the heat pump circuit 10. This assessment is not limited to the temperatures being entirely equal, e.g., the controller 2 assesses whether or not the temperature difference is within a predetermined temperature range. When the temperature difference is within the predetermined range, the sequence returns to step S10 and the above process is repeated. When the temperature difference exceeds the predetermined range, the sequence transitions to step S12.

In step S12, the controller 2 assesses whether or not the outlet refrigerant temperature Tgcout of the gas cooler 6 is lower than the outlet refrigerant temperature Ticout of the intercooler 5. When the outlet refrigerant temperature Tgcout of the gas cooler 6 is assessed to be lower than the outlet refrigerant temperature Ticout of the intercooler 5, the sequence transitions to step S13. Otherwise, the sequence transitions to step S14.

In step S13, because the outlet refrigerant temperature Tgcout of the gas cooler 6 is lower than the outlet refrigerant temperature Ticout of the intercooler 5 by more than a predetermined range, the controller 2 controls the mixing valve 91 so as to raise the water distribution ratio of the intercooler hot-water supply flow passage 90A. Thereby, the outlet refrigerant temperature Ticout of the intercooler 5 falls and the outlet refrigerant temperature Tgcout of the gas cooler 6 rises, and the two temperatures can therefore be made to approach each other. The sequence then returns to step S10 and the above process is repeated.

In step S14, the controller 2 assesses whether or not a flow rate can be ensured whereby the water flow rate Gw_ic of the intercooler hot-water supply flow passage 90A exceeds a predetermined flow speed Gw_min for suppressing pitting corrosion. When the water flow rate is assessed to be exceeding the predetermined flow speed, the controller 2 assesses that there is leeway for further reducing the water flow rate of the intercooler hot-water supply flow passage 90A, and the sequence transitions to step S15. When the water flow rate is assessed to be equal to or less than the predetermined flow speed, the sequence transitions to step S16.

In step S15, because the outlet refrigerant temperature Tgcout of the gas cooler 6 is lower than the outlet refrigerant temperature Ticout of the intercooler 5 by more than the predetermined range and there is leeway for further reducing the water flow rate in the intercooler hot-water supply flow passage 90A, the controller 2 controls the mixing valve 91 so as to reduce the water distribution ratio of the intercooler hot-water supply flow passage 90A. The water flow rate of the gas cooler hot-water supply flow passage 90B also thereby increases as a result. Thereby, the outlet refrigerant temperature Tgcout of the gas cooler 6 can be lowered, the outlet refrigerant temperature Ticout of the intercooler 5 can be raised, and the two temperatures can be made to approach each other.

In step S16, the controller 2 assesses whether or not the discharged refrigerant temperature of the high-stage compression mechanism 26 of the compression mechanism 20 is below a predetermined upper limit refrigerant temperature. When the discharged refrigerant temperature is assessed to be below the predetermined upper limit refrigerant temperature, there is assessed to be leeway for further raising the discharged refrigerant temperature of the high-stage compression mechanism and the sequence transitions to step S17. When the discharged refrigerant temperature of the high-stage compression mechanism 26 is assessed to have reached the predetermined upper limit refrigerant temperature, there is no leeway for raising the discharged refrigerant temperature, the controller 2 therefore assesses that water cannot be allowed to flow to the intercooler hot-water supply flow passage 90A, and the sequence transitions to step S19.

In step S17, the controller 2 controls the drive motor 29 so that the target value of the discharged refrigerant temperature of the high-stage compression mechanism 26 of the compression mechanism 20 rises by $\Delta t$, in order to boil the water flowing through the hot-water supply circuit 90 to the heating target temperature while water continues to flow to the intercooler hot-water supply flow passage 90A. The water flowing through the hot-water supply circuit 90 can thereby be boiled using not only the gas cooler hot-water supply flow passage 90B but the intercooler hot-water supply flow passage 90A as well.

In step S18, the controller 2 regulates so that the flow speed of the water flowing through the intercooler hot-water supply flow passage 90A is maintained at a predetermined flow speed, the sequence returns to step S10, and the above process is repeated.

In step S19, the controller 2 controls the mixing valve 91 so that water does not flow to the intercooler hot-water supply flow passage 90A, and water flows only to the gas cooler hot-water supply flow passage 90B. Specifically, boiling of the water flowing through the hot-water supply circuit 90 to the heating target temperature is performed only in the gas cooler hot-water supply flow passage 90B and only by the heat of the refrigerant flowing through the gas cooler 6. Pitting corrosion in the intercooler hot-water supply flow passage 90A can thereby be prevented, and the heating target temperature of the hot-water supply circuit 90 can be achieved.

(7) Characteristics of Heat Pump System 1

(7-1)

In the heat pump system 1 of the above embodiment, because the compression mechanism 20 has a fixed capacity ratio, the discharged refrigerant temperature of the low-stage compression mechanism 22 cannot be controlled irrespective of the discharged refrigerant temperature of the high-stage compression mechanism 26, and by regulating the flow rate ratio of the amount of water flowing to the intercooler hot-water supply flow passage 90A and the amount of water flowing to the gas cooler hot-water supply flow passage 90B in the hot-water supply circuit 90, the outlet refrigerant temperature of the intercooler 5 and the outlet refrigerant temperature of the gas cooler 6 can be brought near each other. The COP of the heat pump circuit 10 can be made satisfactory in cases in which the outlet refrigerant temperature of the intercooler 5 and the outlet refrigerant temperature of the gas cooler 6 can be brought near each other in this manner.

Consequently, in the heat pump system 1 of the above embodiment, even if the compression mechanism 20 of the heat pump circuit 10 is a fixed capacity ratio multi-stage compression mechanism, the COP of the heat pump circuit 10 can be made satisfactory by controlling the flow rate ratio in the hot-water supply circuit 90 whose configuration is not part of the heat pump circuit 10.

(7-2)

In the heat pump system 1 of the above embodiment, even when the temperature of the refrigerant flowing into the intercooler 5 does not meet the heating target temperature of the hot-water supply circuit 90, the mixing valve 91 is controlled so as to allow water to proactively flow to the intercooler hot-water supply flow passage 90A when the predetermined performance coefficient condition is satisfied. The COP can thereby be made satisfactory even though the compression mechanism 20 has a fixed capacity ratio.

(7-3)

In the heat pump system 1 of the above embodiment, when preserving the speed of water flowing through the intercooler hot-water supply flow passage 90A above the predetermined flow speed that can suppress pitting corrosion has become difficult for achieving the heating target temperature in the hot-water supply circuit 90, the controller 2 performs a control so that either the flow speed of the water flowing through the intercooler hot-water supply flow passage 90A is maintained at the predetermined flow speed that can suppress pitting corrosion, or the flow of water in the intercooler hot-water supply flow passage 90A is stopped.

When the heating target temperature cannot be achieved with the heat of the water flowing through the intercooler hot-water supply flow passage 90A, the heating target temperature can be achieved by performing a control for raising the target value of the discharged refrigerant temperature of the high-stage compression mechanism 26 of the compression mechanism 20. When the target value of the discharged refrigerant temperature of the high-stage compression mechanism 26 of the compression mechanism 20 has reached the upper limit, the heating target temperature can be achieved by stopping the flow of water in the intercooler hot-water supply flow passage 90A and allowing water to flow to the gas cooler hot-water supply flow passage 90B capable of heating by using refrigerant of a higher temperature, instead of raising the capability of the compression mechanism 20.

(8) Other Embodiments

An embodiment of the present invention was described on the basis of the drawings, but the specific configuration is not limited to this embodiment and can be varied within a range that does not deviate from the scope of the invention. The following aspects are examples of other embodiments.

(A)

With the heat pump system 1 of the above embodiment, an example of a heat pump system 1 comprising a hot-water supply circuit 90 was described.

Figure 7:
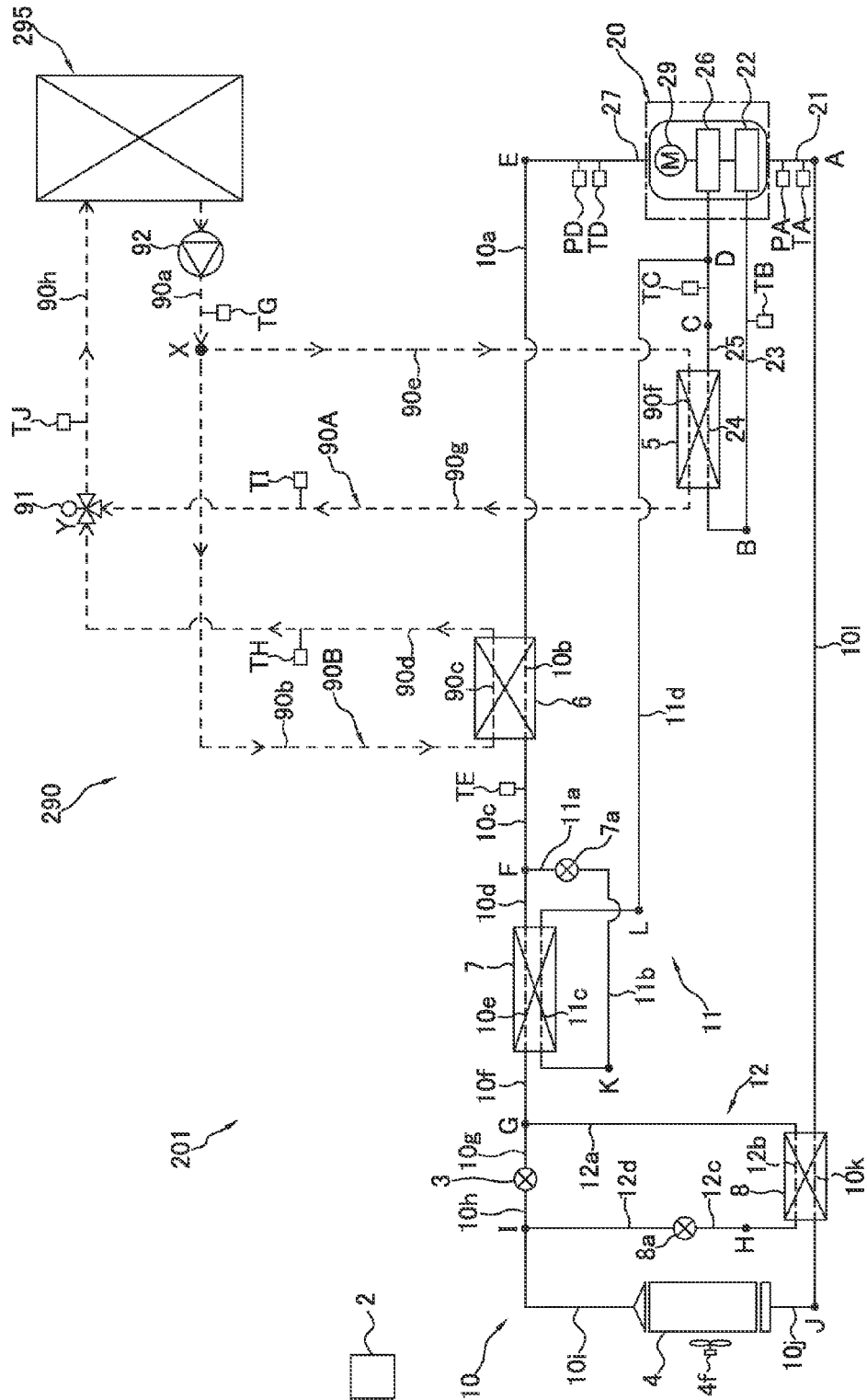
FIG. 7 is a schematic configuration view of the heat pump system according to another embodiment (A)

However, the present invention is not limited as such, and may be a heat pump system 201 in which the object of the heat load process performed by the heat pump circuit 10 is an air-warming circuit 290 such as a radiator or a floor heating instead of the hot-water supply circuit 90, as seen in FIG. 7, for example. The air-warming circuit 290 has a heat exchanger 295 through which water flows as a secondary refrigerant. Aside from not being supplied with water and the like, the configuration is otherwise identical to the hot-water supply circuit 90 of the above embodiment and is therefore not described.

(B)

With the heat pump system 1 of the above embodiment, an example of a heat pump system 1 comprising a hot-water supply circuit 90 was described.

Figure 8:
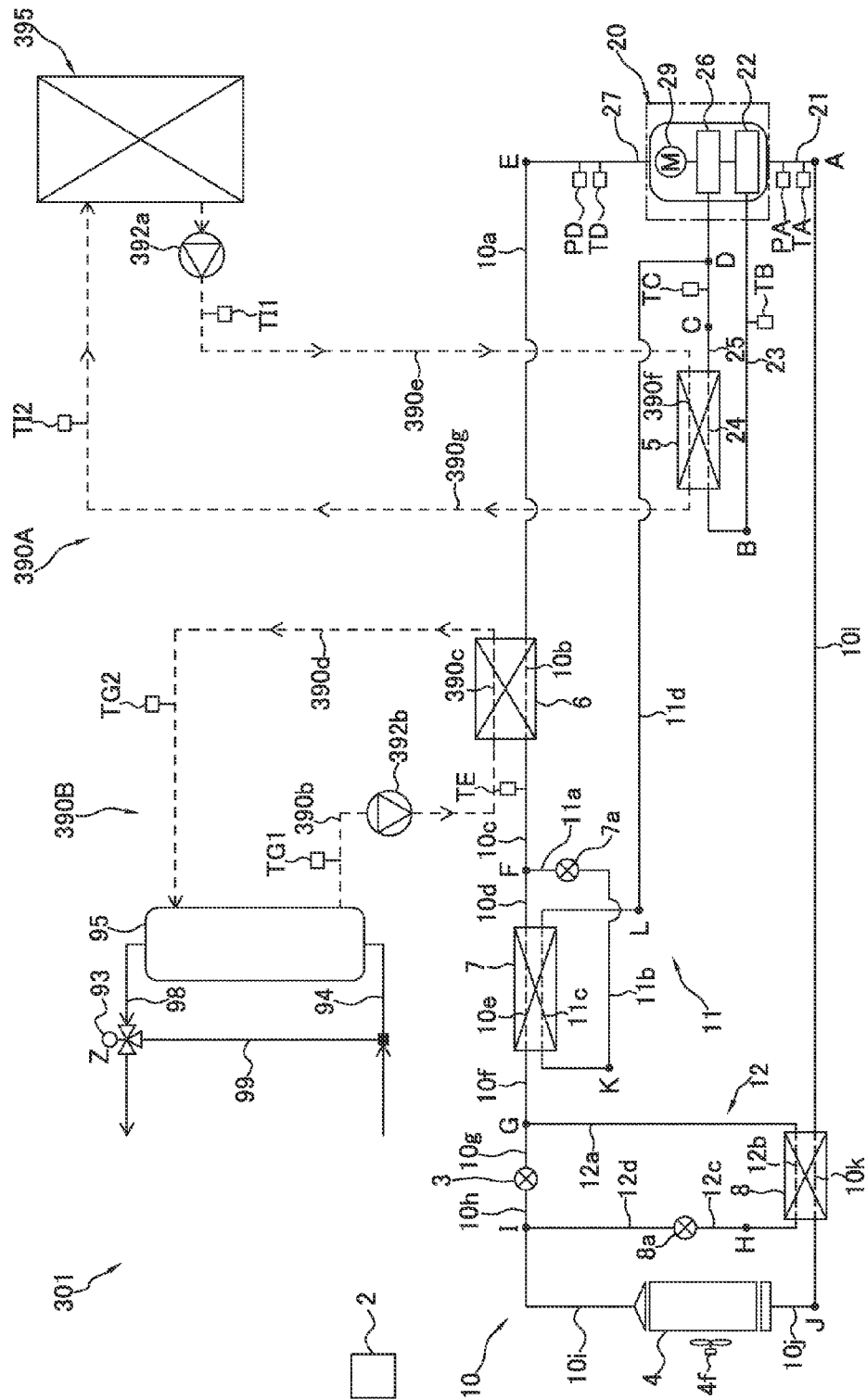
FIG. 8 is a schematic configuration view of the heat pump system according to another embodiment (B)

However, the present invention is not limited as such; the object of the heat load process performed by the heat pump circuit 10 may be a heat pump system 301 having an air-warming circuit 390A and a hot-water supply circuit 390B, as seen in FIG. 8, for example. The same member numerals as those of the above embodiment indicate for the most part the same configurations, and descriptions are omitted.

In this heat pump system 301, the heat of the refrigerant flowing through the intercooler 5 of the heat pump circuit 10 is used to heat a secondary refrigerant flowing through the air-warming circuit 390A which is a radiator, a floor heating, or the like. The heat of the refrigerant flowing through the gas cooler 6 of the heat pump circuit 10 is used to heat water for a hot-water supply flowing through the hot-water supply circuit 390B.

The hot-water supply circuit 390B has a first gas cooler hot-water supply flow passage 390*b* extending from the bottom of the hot water storage tank 95, a second gas cooler hot-water supply flow passage 390*c* flowing through the interior of the gas cooler 6, and a third gas cooler hot-water supply flow passage 390*d* for returning heated water to the top of the hot water storage tank 95. The first gas cooler hot-water supply flow passage 390*b* is provided with a hot-water supply pump 392*b* for regulating the flow rate of water for the hot-water supply, and a pre-gas cooler hot-water supply temperature sensor TG1. A post-gas cooler hot-water supply temperature sensor TG2 is provided to the third gas cooler hot-water supply flow passage 390*d*.

The air-warming circuit 390A has a first intercooler air-warming flow passage 390*e* extending from a heat exchanger 395, a second intercooler air-warming flow passage 390*f* flowing through the interior of the intercooler 5, and a third intercooler air-warming flow passage 390*g* for returning the heated secondary refrigerant to the heat exchanger 395. The first intercooler air-warming flow passage 390*e* is provided with an air-warming pump 392*a* for regulating the flow rate of the secondary refrigerant for air-warming, and a pre-intercooler air-warming temperature sensor TI1. The third intercooler air-warming flow passage 390*g* is provided with a post-intercooler air-warming temperature sensor TI2.

The controller 2 regulates the ratio of the flow rate of the secondary refrigerant in the air-warming pump 392*a* and the flow rate of the water for the hot-water supply in the hot-water supply pump 392*b*, so that the outlet refrigerant temperature of the intercooler 5 of the heat pump circuit 10 and the outlet refrigerant temperature of the gas cooler 6 approach each other.

When such control is performed, even if the outlet refrigerant temperature of the intercooler 5 of the heat pump circuit 10 and the outlet refrigerant temperature of the gas cooler 6 can be brought near each other merely by controlling the flow rates of the air-warming circuit 390A and the hot-water supply circuit 390B, there is a risk that it will not be possible to achieve the target temperature in the air-warming circuit 390A and/or the hot-water supply circuit 390B. Therefore, in addition to performing such control, capacity control for the compression mechanism 20 of the heat pump circuit 10 may be performed accordingly. Otherwise, such control may be limited to cases in which a temperature-maintaining operation is performed in the air-warming circuit 390A and/or the hot-water supply circuit 390B.

(C)

With the heat pump system 1 of the above embodiment, an example was described of a case in which control was performed so that the outlet refrigerant temperature of the intercooler 5 and the outlet refrigerant temperature of the gas cooler 6 approached each other within a predetermined range.

However, the present invention is not limited as such; the controller 2 may perform the control described above with the objective being that the outlet refrigerant temperature of the intercooler 5 and the outlet refrigerant temperature of the gas cooler 6 be entirely the same temperature, for example.

(D)

In the above embodiment, an example was described of a case in which, for the flow speed of water in the intercooler hot-water supply flow passage 90A, a value for assessing whether or not the flow speed would result in pitting corrosion and a value maintained as the flow speed of the intercooler hot-water supply flow passage 90A in step S18 were the same.

However, the present invention is not limited as such; the value for assessing whether or not the flow speed will result in pitting corrosion and the value maintained as the flow speed of the intercooler hot-water supply flow passage 90A in step S18 in the above embodiment may be different, for example. Specifically, control may be performed so as to maintain the flow speed at a greater speed than which is intended to be maintained as the flow speed of the intercooler hot-water supply flow passage 90A in step S18 in the above embodiment.

INDUSTRIAL APPLICABILITY

The heat pump system of the present invention is particularly useful when applied to a multi-stage compression refrigeration cycle in which the capacity ratio is fixed.

What is claimed is:

1. A heat pump system comprising:
a heat pump circuit including a compression mechanism with a low-stage compression mechanism and a high-stage compression mechanism having a fixed capacity ratio relationship, an expansion mechanism, and an evaporator, with a refrigerant being circulated through the heat pump circuit;
a load distribution element configured and arranged to establish a load distribution between
a first heat load subjected to a heating process by heat exchange with a refrigerant discharged from the low-stage compression mechanism, and
a second heat load subjected to a heating process by heat exchange with a refrigerant discharged from the high-stage compression mechanism; and
a controller configured to perform a distribution control of the load distribution element
so as to maintain a ratio of 1 between
a temperature of the refrigerant discharged from the low-stage compression mechanism and after heat exchange with the first heat load, and
a temperature of the refrigerant discharged from the high-stage compression mechanism and after heat exchange with the second heat load; or
so as to reduce a difference between
the temperature of the refrigerant discharged from the low-stage compression mechanism and after heat exchange with the first heat load, and
the temperature of the refrigerant discharged from the high-stage compression mechanism and after heat exchange with the second heat load.

2. The heat pump system according to claim 1, wherein the load distribution element includes
a heat load circuit having a branching portion, a converging portion, a first passage connecting the branching portion and the converging portion, and a second passage connecting the branching portion and the converging portion without converging with the first passage, a fluid flowing through the heat load circuit, and
a flow rate regulation mechanism configured and arranged to regulate a ratio between a flow rate of the fluid flowing through the first passage and a flow rate of the fluid flowing through the second passage; and
the heat pump system further comprises:
a first heat exchanger arranged and configured to perform heat exchange between the refrigerant flowing from the discharge side of the low-stage compression mechanism toward the intake side of the high-stage compression mechanism and the fluid flowing through the first passage; and
a second heat exchanger arranged and configured to perform heat exchange between the refrigerant flowing from the high-stage compression mechanism to the expansion mechanism and the fluid flowing through the second passage,
in the distribution control performed by the controller, the flow rate regulation mechanism is operated
so as to maintain a ratio of 1 between a temperature of the refrigerant flowing through an outlet of the first heat exchanger in the heat pump circuit and a temperature of the refrigerant flowing through an outlet of the second heat exchanger in the heat pump circuit; or
so as to reduce a difference between the temperature of the refrigerant flowing through the outlet of the first heat exchanger in the heat pump circuit and the temperature of the refrigerant flowing through the outlet of the second heat exchanger in the heat pump circuit.

3. The heat pump system according to claim 2, wherein when a temperature of refrigerant flowing into the second heat exchanger is higher than a temperature of the refrigerant flowing into the first heat exchanger and when a flow rate of the fluid flowing to the first heat exchanger is less than a first predetermined flow rate due to the flow rate regulation control being performed, the controller
performs high-stage discharge temperature control of the flow rate regulation mechanism so that a flow rate of the fluid flowing to the first heat exchanger is maintained at a flow rate of at least the first predetermined flow rate, and
controls the heat pump circuit so as to raise a target temperature of the discharged refrigerant of the high-stage compression mechanism.

4. The heat pump system according to claim 3, wherein the controller performs the high-stage discharge temperature control in a range such that the target temperature of the discharged refrigerant of the high-stage compression mechanism does not exceed a predetermined upper limit temperature, and
if the upper limit temperature is exceeded, the controller controls the flow rate regulation mechanism so that the fluid does not flow to the first heat exchanger but the fluid does flow to the second heat exchanger.

* * * * *